United States Patent
Li et al.

(10) Patent No.: US 11,066,574 B2
(45) Date of Patent: Jul. 20, 2021

(54) SELF-HEALING COATING COMPOSITIONS

(71) Applicant: Nano and Advanced Materials Institute Limited, Hong Kong (CN)

(72) Inventors: Siyue Li, Hong Kong (CN); Yin Ming Ng, Hong Kong (CN); Ching Man Chan, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 126 days.

(21) Appl. No.: 16/423,446

(22) Filed: May 28, 2019

(65) Prior Publication Data

US 2019/0367771 A1 Dec. 5, 2019

Related U.S. Application Data

(60) Provisional application No. 62/762,962, filed on May 29, 2018.

(51) Int. Cl.
| | |
|---|---|
| *C09D 175/08* | (2006.01) |
| *C08G 18/34* | (2006.01) |
| *C08G 18/38* | (2006.01) |
| *C08G 18/42* | (2006.01) |
| *C08G 18/48* | (2006.01) |
| *C08G 18/66* | (2006.01) |
| *C08G 18/73* | (2006.01) |
| *C09D 175/06* | (2006.01) |
| *C09D 5/00* | (2006.01) |

(52) U.S. Cl.
CPC ......... *C09D 175/08* (2013.01); *C08G 18/348* (2013.01); *C08G 18/3868* (2013.01); *C08G 18/4277* (2013.01); *C08G 18/4833* (2013.01); *C08G 18/6633* (2013.01); *C08G 18/6659* (2013.01); *C08G 18/6666* (2013.01); *C08G 18/6692* (2013.01); *C08G 18/73* (2013.01); *C09D 5/00* (2013.01); *C09D 175/06* (2013.01)

(58) Field of Classification Search
None
See application file for complete search history.

(56) References Cited

U.S. PATENT DOCUMENTS

| 7,872,069 B2 | 1/2011 | Xia et al. | |
|---|---|---|---|
| 8,431,648 B2 | 4/2013 | Xia et al. | |
| 2004/0259970 A1* | 12/2004 | Lockhart | C08G 18/68 522/84 |
| 2017/0218110 A1* | 8/2017 | Arzt | C08G 18/6659 |
| 2018/0005770 A1 | 1/2018 | Dunn et al. | |
| 2020/0157271 A1* | 5/2020 | Hwang | C08G 18/4854 |

FOREIGN PATENT DOCUMENTS

| CN | 105482065 A | 4/2016 |
|---|---|---|
| CN | 107793908 A | 3/2018 |

* cited by examiner

*Primary Examiner* — Jeffrey D Washville
(74) *Attorney, Agent, or Firm* — Spruson & Ferguson (Hong Kong) Limited

(57) ABSTRACT

The present disclosure provides a self-healing coating composition precursor that includes a soft segment precursor, a hard segment precursor, and a diol. The present disclosure also provides self-healing coatings including the same for scratches and deep cracks and/or anti-fouling property, and methods of preparation and use thereof.

20 Claims, 11 Drawing Sheets

SELF-HEALING COATING COMPOSITIONS

CROSS-REFERENCE TO RELATED APPLICATIONS

This application claims the benefit of priority of U.S. Provisional Application No. 62/762,962, filed on May 29, 2018, the contents of which being hereby incorporated by reference in their entirety for all purposes.

TECHNICAL FIELD

The present disclosure relates to compositions useful as self-healing coatings with anti-fouling properties, methods of production thereof, and self-healing coatings and/or materials comprising the same.

BACKGROUND

Self-healing coating materials have been extensively studied in the field of material science during the last decade with the aim of developing coatings that retain functional properties and restore their structural integrity automatically after damage. After applying these coatings on different surfaces, this self-healing ability can result in prolonged material service life, less maintenance requirements, and hence cost reductions.

In previous studies, these self-healing coatings were only designed to heal either scratches or deep cracks. In other words, the existing self-healing coatings that can heal scratches, e.g. shallow and medium ones, cannot heal deep cracks; and those that can heal deep cracks cannot heal scratches.

Self-healing coatings that can heal both scratches and deep cracks are highly desirable in the coating market. Additional functionalities such as anti-fouling properties are also desirable in the coating market.

Therefore, there is a need for developing self-healing coatings that can heal scratches and deep cracks, and also have anti-fouling properties.

SUMMARY

Provided herein are improved self-healing compositions that can be readily prepared from commercially available materials and can heal both scratches and deep cracks and also have anti-fouling properties.

In a first aspect of the present disclosure, provided herein is a coating composition precursor comprising: a soft segment precursor selected from the group consisting of polycaprolactone diol (PCL diol), polycaprolactone triol, poly(tetramethylene adipate) diol, polyethylene glycol (PEG), polytetrahydrofuran (PTHF) and a combination thereof; a hard segment precursor selected from the group consisting of hexamethylene diisocyanate trimer (HDI trimer), hexamethylene diisocyanate, isophorone diisocyanate, 4,4'-dicyclohexylmethane diisocyanate and a combination thereof; and a diol selected from the group consisting of 2,2-bis(hydroxylmethyl)propionic acid (DMPA), 2,3-dihydroxyl propionic acid, 2,2-bis(hydroxylmethyl)butyric acid (DMBA), dihydroxybenzoic acid, dihydroxysuccinic acid, bis(2-hydroxyehtyl)disulfide (HEDS) and a combination thereof; wherein the soft segment precursor, the hard segment precursor, and the diol are present in a molar ratio of 1:4.5-9:0.1-1.

In a first embodiment of the first aspect of the present disclosure, the soft segment precursor is PCL diol, the hard segment precursor is HDI trimer, and the diol is DMPA.

In a second embodiment of the first aspect of the present disclosure, the molar ratio of the PCL diol, the HDI trimer, and the DMPA is 1:6:0.1-0.5.

In a third embodiment of the first aspect of the present disclosure, the molar ratio of the PCL diol, the HDI trimer, and the DMPA is 1:6:0.1.

In a fourth embodiment of the first aspect of the present disclosure, the soft segment precursor is PEG, the hard segment precursor is HDI trimer, and the diol is DMPA, wherein the molar ratio of the PEG, the HDI trimer, and the DMPA is 1:6:0.1-0.5.

In a fifth embodiment of the first aspect of the present disclosure, the molar ratio of the PEG, the HDI trimer, and the DMPA is 1:6:0.1.

In a sixth embodiment of the first aspect of the present disclosure, the soft segment precursor is PCL diol, the hard segment precursor is HDI trimer, and the diol is HEDS, wherein the molar ratio of the PCL diol, the HDI trimer, and the HEDS is 1:6:0.1-0.5.

In a seventh embodiment of the first aspect of the present disclosure, the molar ratio of the PCL diol, the HDI trimer, and the HEDS is 1:6:0.1.

In an eighth embodiment of the first aspect of the present disclosure, the soft segment precursor is PEG, the hard segment precursor is HDI trimer, and the diol is HEDS, wherein the molar ratio of the PEG, the HDI trimer, and the HEDS is 1:6:0.1-0.5.

In a ninth embodiment of the first aspect of the present disclosure, the molar ratio of the PEG, the HDI trimer, and the HEDS is 1:6:0.1.

In a tenth embodiment of the first aspect of the present disclosure, the coating composition precursor further comprises poly(ethylene glycol) methyl ether (mPEG).

In an eleventh embodiment of the first aspect of the present disclosure, the hard segment precursor is PCL diol, the hard segment precursor is HDI trimer, and the diol is DMPA, wherein the molar ratio of the PCL diol, the HDI trimer, the DMPA, and the mPEG is 1:6:0.1-0.5:0.01-0.1.

In a twelfth embodiment of the first aspect of the present disclosure, the molar ratio of the PCL diol, is HDI trimer, DMPA, and mPEG is 1:6:0.1:0.1.

In a thirteenth embodiment of the first aspect of the present disclosure, the soft segment precursor has an average molecular weight of about 100 to about 1000.

In a fourteenth embodiment of the first aspect of the present disclosure, the soft segment precursor is PCL diol having an average molecular weight of about 530, or PEG having an average molecular weight of about 400.

In a fifteenth embodiment of the first aspect of the present disclosure, the mPEG has an average molecular weight of about 550 to about 950.

In a second aspect of the present disclosure, provided herein is a method of preparing the coating composition described herein, comprising the steps of: a. contacting the soft segment precursor and the hard segment precursor to form a first mixture; and b. contacting the first mixture with the diol thereby forming the coating composition precursor.

In a third aspect of the present disclosure, provided herein a self-healing coating, formed by applying the coating composition precursor described herein on a substrate via an applying method.

In a first embodiment of the third aspect of the present disclosure, the substrate is glass, magnesium (Mg), aluminium (Al), acrylonitrile butadiene styrene (ABS), polycarbonate (PC), poly(methyl methacrylate) (PMMA), titanium alloys, or stainless steel.

In a second embodiment of the third aspect of the present disclosure, the applying step is dropping, molding, spraying, brushing, rolling, painting, or spinning.

The self-healing coatings and/or materials of the present disclosure can heal both scratches and deep cracks and can be applied on a wide range of substrate materials. In addition, the self-healing coatings and/or materials of the present disclosure have anti-fouling properties. The coatings with scratches can recover to their intact status at ambient temperature without external intervention. The coatings with deep cracks can recover to their intact status at ambient temperature in the presence of moisture. The coating composition of the present disclosure also exhibits excellent adhesion to a wide range of substrates for use under diverse settings.

Advantageously, the amount of lead (Pb), mercury (Hg), cadmium (Cd), hexavalent chromium ($Cr^{6+}$), polybrominated biphenyls (PBB), polybrominated diphenyl ether (PBDE) in the self-healing coatings of the present disclosure are lower than the limit as set in the Restriction of Hazardous Substances: RoHS Directive (EU) 2015/863 amending Annex II to Directive 2011/65/EU. The amount of organotin, cadmium, polycyclic aromatic hydrocarbons and lead in the self-healing coatings of the present disclosure are lower than the limit as set in the Registration, Evaluation, Authorization and restriction of Chemicals (REACH) test.

BRIEF DESCRIPTION OF DRAWINGS

It should be understood that the drawings described herein are for illustration purposes only. The drawings are not necessarily to scale, with emphasis generally being placed upon illustrating the principles of the present teachings. The drawings are not intended to limit the scope of the present teachings in any way.

DETAILED DESCRIPTION

Figure 1:
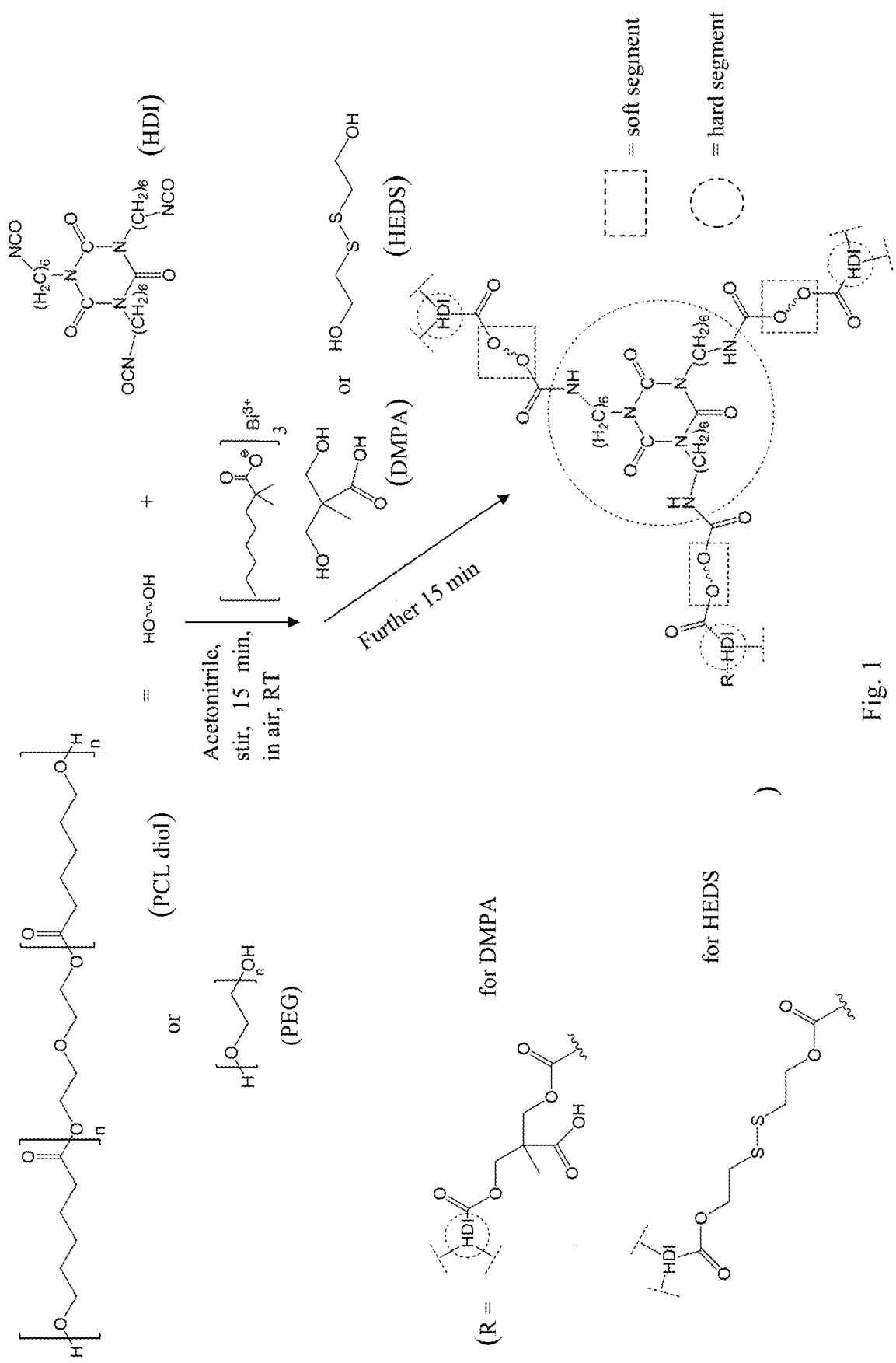
FIG. 1 depicts an exemplary synthetic sequence of a polycaprolactone diol (PCL diol)/polyethylene glycol (PEG)-hexamethylene diisocyanate trimer (HDI)-2,2-bis (hydroxylmethyl)propionic acid (DMPA)/bis(2-hydroxyehtyl)disulfide (HEDS) polymer network of the coating composition according to certain embodiments described herein.

The present disclosure relates to a self-healing coating composition precursor comprising a soft segment precursor, a hard segment precursor, and a diol.

Definitions

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of." Unless specified otherwise, all values provided herein include up to and including the endpoints given, and the values of the constituents or components of the compositions are expressed in weight percent or % by weight of each ingredient in the composition.

As used herein, the term "about" when used in connection with a numerical value refers to a range of numerical values ±5% of the specified numerical value. In certain embodiments, "about" when used in connection with a numerical value can refer to the specified numerical value or +5%, +4.5%, +4%, +3.5%, +3%, +2.5%, +2%, +1.5%, +1%, +0.5%, −0.5%, −1%, −1.5%, −2%, −2.5%, −3%, −3.5%, −4%, −4.5%, or −5% of the specified numerical value.

As used herein, the terms "self-healing" and "self-repairing" are used interchangeably and refer to an ability to return to original condition and gloss after abrasion and mechanical damage. The original condition and gloss of a coating is the condition and gloss of the coating before abrasion and mechanical damage.

In certain embodiments, the self-healing coating composition precursor comprises a soft segment precursor, a hard segment precursor, and a diol. The soft segment precursor can be polycaprolactone diol (PCL diol), polycaprolactone triol (PCL triol), poly(tetramethylene adipate) diol, polyethylene glycol (PEG), or polytetrahydrofuran (PTHF). The hard segment precursor can be hexamethylene diisocyanate trimer (HDI trimer), hexamethylene diisocyanate, isophorone diisocyanate, or 4,4'-dicyclohexylmethane diisocyanate. The diol can be 2,2-bis(hydroxylmethyl)propionic acid (DMPA), 2,3-dihydroxyl propionic acid, 2,2-bis(hydroxylmethyl)butyric acid (DMBA), dihydroxybenzoic acid, dihydroxysuccinic acid, or bis(2-hydroxyehtyl)disulfide (HEDS).

In certain embodiments, the molar ratio of the soft segment precursor, the hard segment precursor, and the diol is 1:4.5-9:0.1-1, 1:5-8.5:0.1-1, 1:5.5-8:0.1-1, 1:6-7.5:0.1-1, 1:6.5-7:0.1-1, 1:6:0.1-1, 1:6:0.2-0.9, 1:6:0.3-0.8, 1:6:0.4-0.7, or 1:6:0.5-0.6. In certain embodiments, the molar ratio of the soft segment precursor, the hard segment precursor, and the diol is 1:6:0.1.

The molar ratio of the soft segment precursor (e.g. PCL diol) and the hard segment precursor (e.g. HDI trimer) is 1:4.5 to 1:9, which is crucial for the self-healing performance. The molar ratio determines the number of carbamate groups in the polyurethane network which provide the hydrogen bonding interactions leading for self-healing property. The molar ratio of the soft segment precursor (e.g. PCL diol) and the diol (e.g. DMPA) is 1:0.1 to 1:1.

The hard segment precursor of the present disclosure can be an organic compound having at least two —NCO reactive functional groups that are available for reaction with the —OH reactive groups in the soft segment precursor to form a polyurethane network.

In certain embodiments, the hard segment precursor of the present disclosure can be an organic compound having at least two blocked isocyanate functional groups.

The polyurethane network is a network of polymer composed of organic units joined by carbamate links (—NH—C(—O)—O—) which provides hydrogen bonding for self-healing property. The hydrogen bonds between hard (diisocyante) and soft (polyol and dihydroxyl carboxylic acid) segments can readily break and reform. Without wishing to be bound by theory, it is believed that this elastic network gives the self-healing property of the coating of the present disclosure. While the coating of the present disclosure can demonstrate elasticity for self-healing, the coating is able to provide protection on the underlying substrate. The coating can exhibit a hardness of up to 4H according to the ASTM D3363 Standard Test Method for Film Hardness by Pencil Test.

In certain embodiments, the soft segment precursor is PCL diol, the hard segment precursor is HDI trimer, and the diol is DMPA. In certain embodiments, the molar ratio of the PCL diol, the HDI trimer, and the DMPA is 1:6:0.1-0.5, 1:6:0.15-0.45, 1:6:0.2-0.4, 1:6:0.25-0.35, or 1:6:0.3. In certain embodiments, the molar ratio of the PCL diol, the HDI trimer, and the DMPA is 1:6:0.1.

In certain embodiments, the soft segment precursor is PEG, the hard segment precursor is HDI trimer, and the diol is DMPA, wherein the molar ratio of the PEG, the HDI trimer, and the DMPA is 1:6:0.1-0.5, 1:6:0.15-0.45, 1:6:0.2-0.4, 1:6:0.25-0.35, or 1:6:0.3. In certain embodiments, the molar ratio of the PEG, the HDI trimer, and the DMPA is 1:6:0.1.

In certain embodiments, the soft segment precursor is PCL diol, the hard segment precursor is HDI trimer, and the diol is HEDS, wherein the molar ratio of the PCL diol, the HDI trimer, and the HEDS is 1:6:0.1-0.5, 1:6:0.15-0.45, 1:6:0.2-0.4, 1:6:0.25-0.35, or 1:6:0.3. In certain embodiments, the molar ratio of the PCL diol, the HDI trimer, and the HEDS is 1:6:0.1.

In certain embodiments, the soft segment precursor is PEG, the hard segment precursor is HDI trimer, and the diol is HEDS, wherein the molar ratio of the PEG, the HDI trimer, and the HEDS is 1:6:0.1-0.5, 1:6:0.15-0.45, 1:6:0.2-0.4, 1:6:0.25-0.35, or 1:6:0.3. In certain embodiments, the molar ratio of the PEG, the HDI trimer, and the HEDS is 1:6:0.1.

The molar ratio of the soft segment and disulfide (e.g. HEDS) can be 1:0.1 to 1:1. The coating composition precursor of the present disclosure self-repairs from mechanical damage, such as scratches, deep cracks, and abrasions, under ambient conditions. No external intervention or input is required for self-healing scratch, but moisture environment is needed for self-healing crack. Ambient conditions refer to the atmospheric temperature and pressure under normal living conditions. The self-healing/repair property of coating formed from the coating composition of the present disclosure is exhibited once the coating composition is dried and a coating is formed on the substrate. Coatings of the present disclosure recover from damage ranging from fine scratches to deep cracks. Coatings of the present disclosure recover to their original conditions and gloss even after multiple rounds of damage.

Without wishing to be bound by theory, it is believed that the incorporation of DMPA and HEDS can improve the healing properties of the coatings due in part to their capacity to take part in intermolecular interactions, such as sulfur-sulfur sigma bond metathesis (for HEDS) and hydrogen bonding (for DMPA).

The coating composition precursor of the present disclosure can self-repair from mechanical damage, such as scratches, deep cracks, and abrasions, under ambient conditions. No external intervention or input is required for self-healing scratch, but in some instances moisture (e.g., from the surrounding environment) may be needed for self-healing of cracks. Ambient conditions refer to the atmospheric temperature and pressure at normal living conditions. The self-healing/repair property of coatings formed from the coating composition precursor of the present disclosure is exhibited once the coating is dried and a coating is formed on the substrate. The coatings of the present disclosure can recover to their original condition and gloss even after multiple rounds of damage, such as scratches and deep cracks.

In certain embodiments, the coatings of the present disclosure exhibit anti-fouling properties. Anti-fouling properties can be imparted through incorporating anti-fouling polymers into the coating composition precursor. Anti-fouling polymers suitable for the anti-fouling self-healing coating of the present disclosure are the polymer chains that provide low interfacial energy to the coating surface, such as polyethers. In certain embodiments, polymer chains for incorporation in the composition described herein includes, but not limited to, poly(ethylene glycol) methyl ether (mPEG). The steric repulsion caused by the flexible long chain of mPEG can limit the bacteria adsorption on the coating surface. Besides, the strong hydration layer due to the polymer hydrophilicity on the coating surface can further reduce the chance of direct contact between bacteria and the product surface. The non-toxic and anti-fouling characteristics of the coating composition according to certain embodiments of the present disclosure allow its application in consumer products, where the coating can protect the underlying substrate and increase the product life cycle via its self-repairing nature.

In certain embodiments, the self-healing coating composition precursor further comprises an anti-fouling polymer. In certain embodiments, the anti-fouling polymer is mPEG. In certain embodiments, the molar ratio of the PCL diol, the HDI trimer, the DMPA, and the mPEG is 1:6:0.1-0.5:0.01-0.1, 1:6:0.15-0.45:0.01-0.1, 1:6:0.2-0.4:0.01-0.1, 1:6:0.25-0.35:0.01-0.1, 1:6:0.3:0.01-0.1, 1:6:0.1:0.02-0.09, 1:6:0.1:0.03-0.08, 1:6:0.1:0.04-0.07, or 1:6:0.1:0.05-0.06. In certain embodiments, the molar ratio of the PCL diol, the HDI trimer, the DMPA, and the mPEG is 1:6:0.1:0.1.

In certain embodiments, the soft segment precursor has an average molecular weight of about 100 to about 1000, about 150 to about 950, about 200 to about 900, about 250 to about 850, about 300 to about 800, about 350 to about 750, about 400 to about 700, about 450 to about 650, about 500 to about 600, or about 550. In certain embodiments, the soft segment precursor is PCL diol having an average molecular weight of about 530. In certain embodiments, the soft segment precursor is PEG having an average molecular weight of about 400.

In certain embodiments, the mPEG has an average molecular weight of about 550 to about 950, about 600 to about 900, about 650 to about 850, about 700 to about 800, or about 750. In certain embodiments, the mPEG has an average molecular weight of about 750.

In certain embodiments, the coating composition precursor comprises a soft segment precursor, a hard segment precursor, and at least one microcapsule comprising at least one self-healing agent. In certain embodiments, the at least one microcapsule comprises a melamine-urea-aldehyde (MUF) shell surrounding the at least one self-healing agent. In certain embodiments, the at least one self-healing agent is isophorone diisocyanate (IPDI), diluents, and combinations thereof. In certain embodiments, the diluent is cyclohexane, toluene, or hexadecane.

The present disclosure also provides a method of preparing the coating composition described herein. In certain embodiments, the method comprises steps of a) contacting the soft segment precursor and the hard segment precursor to form a first mixture; and b) contacting the first mixture with the diol thereby forming the coating composition precursor. In certain embodiments, step a) and step b) are carried out at room temperature. In certain embodiments, the step a) is conducted for about 5 min to about 25 min, about 6 min to about 24 min, about 7 min to about 23 min, about 8 min to about 22 min, about 8 min to about 21 min, about 9 min to about 20 min, about 10 min to about 19 min, about 11 min to about 18 min, about 12 min to about 17 min, about 13 min to about 16 min, or about 14 min to about 15 min. In certain embodiments, the step a) is conducted for about 15 min. In certain embodiments, step b) and step b) are carried out at room temperature. In certain embodiments, the step b) is conducted for about 5 min to about 25 min, about 6 min to about 24 min, about 7 min to about 23 min, about 8 min to about 22 min, about 8 min to about 21 min, about 9 min to about 20 min, about 10 min to about 19 min, about 11 min to about 18 min, about 12 min to about 17 min, about 13 min to about 16 min, or about 14 min to about 15 min. In certain embodiments, the step a) is conducted for about 15 min.

In certain embodiments, the first mixture further comprises a catalyst, and a leveling agent. In certain embodiments, the catalyst is bismuth neodecanoate, organotin, zinc acetate, trimethylamine, triethylamine, ethyl acetate, and/or a combination thereof. In certain embodiments, the leveling agent is a siloxane surfactant, e.g. YCK1110.

The present disclosure also provides a self-healing coating, which is formed by applying the coating composition precursor described herein on a substrate via an application method. In certain embodiments, the substrate is glass, magnesium (Mg), aluminium (Al), acrylonitrile butadiene styrene (ABS), polycarbonate (PC), poly(methyl methacrylate) (PMMA), titanium alloys, or stainless steel. In certain embodiments, the application method is dropping, molding, spraying, brushing, rolling, painting, or spinning.

In certain embodiments, the self-healing coating composition has a volume solid of about 30% to about 40%, about 31% to about 39%, about 32% to about 38%, about 33% to about 37%, about 34% to about 36%, or about 35%.

The present disclosure also provides a kit that includes a first vessel comprising the soft segment described herein, a second vessel comprising the hard segment described herein, a third vessel comprising the diol described herein, and optionally a fourth vessel comprising an anti-fouling composition/polymer described herein. The kit can further comprise a fifth vessel comprising a catalyst, and a sixth vessel comprising a leveling agent described herein. In certain embodiments, the kit includes a first vessel comprising the soft segment and diols described herein and a second vessel comprising the hard segment described herein. The kit can further comprise a third vessel comprising a catalyst, and a fourth vessel comprising a leveling agent described herein. The kit can further comprise instructions for preparing the self-healing coating compositions in accordance with the methods described herein.

The following non-limiting examples are illustrative of self-healing coating composition precursors in accordance with the invention:

EXAMPLES

Example 1

Figure 2:
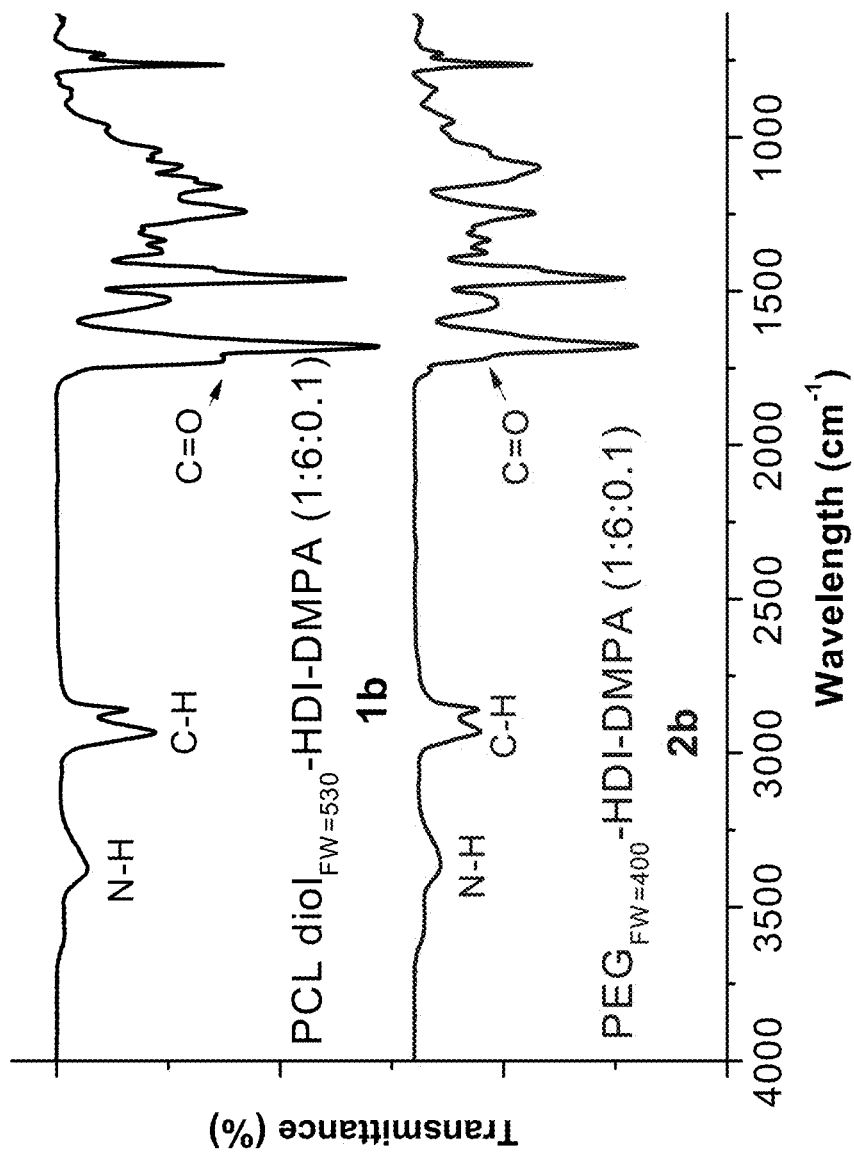
FIG. 2 depicts FTIR spectra of the coating formed from the coating composition made of a) PCL diol-HDI-DMPA (1:6:0.1) (upper line) and b) PEG-HDI-DMPA (1:6:0.1) (lower line) with bismuth neodecanoate as catalyst according to certain embodiments described herein.

According to certain embodiments of the present disclosure, the polymer network is formed by an in-situ polymerization of 12.9-25.7 g of hexamethylene diisocyanate trimer (HDI) (average molecular weight: 504.6), 3.0 g of polycaprolactone diol (PCL diol, average molecular weight: 530) and 0.076-0.76 g of 2,2-bis(hydroxymethyl)propionic acid (DMPA, average molecular weight: 134.13). The acetonitrile solution containing PCL diol (1 equiv), HDI (4.5-9 equiv.), 0.1 g YCK1110, 0.01 g bismuth neodecanoate as catalyst (dissolved in 0.1 mL DMSO) and 2.5 mL 2-butanone were allowed to stir at room temperature for 15 min. After that, DMPA (0.1-1 equiv.) was added into the mixture and the whole solution was allowed to stir at room temperature for further 15 min before it was used for spraying on substrate. The substrate coated with the above-mentioned PCL diol-HDI-DMPA mixture was then cured at 60° C. FIG. 1 shows the synthesis route of a PCL diol-HDI-DMPA polymer network according to certain embodiments of the present disclosure. ATR-FTIR spectrum of PCL diol-HDI-DMPA (1:6:0.1) polymer film is shown in FIG. 2 (upper line).

Figure 4:
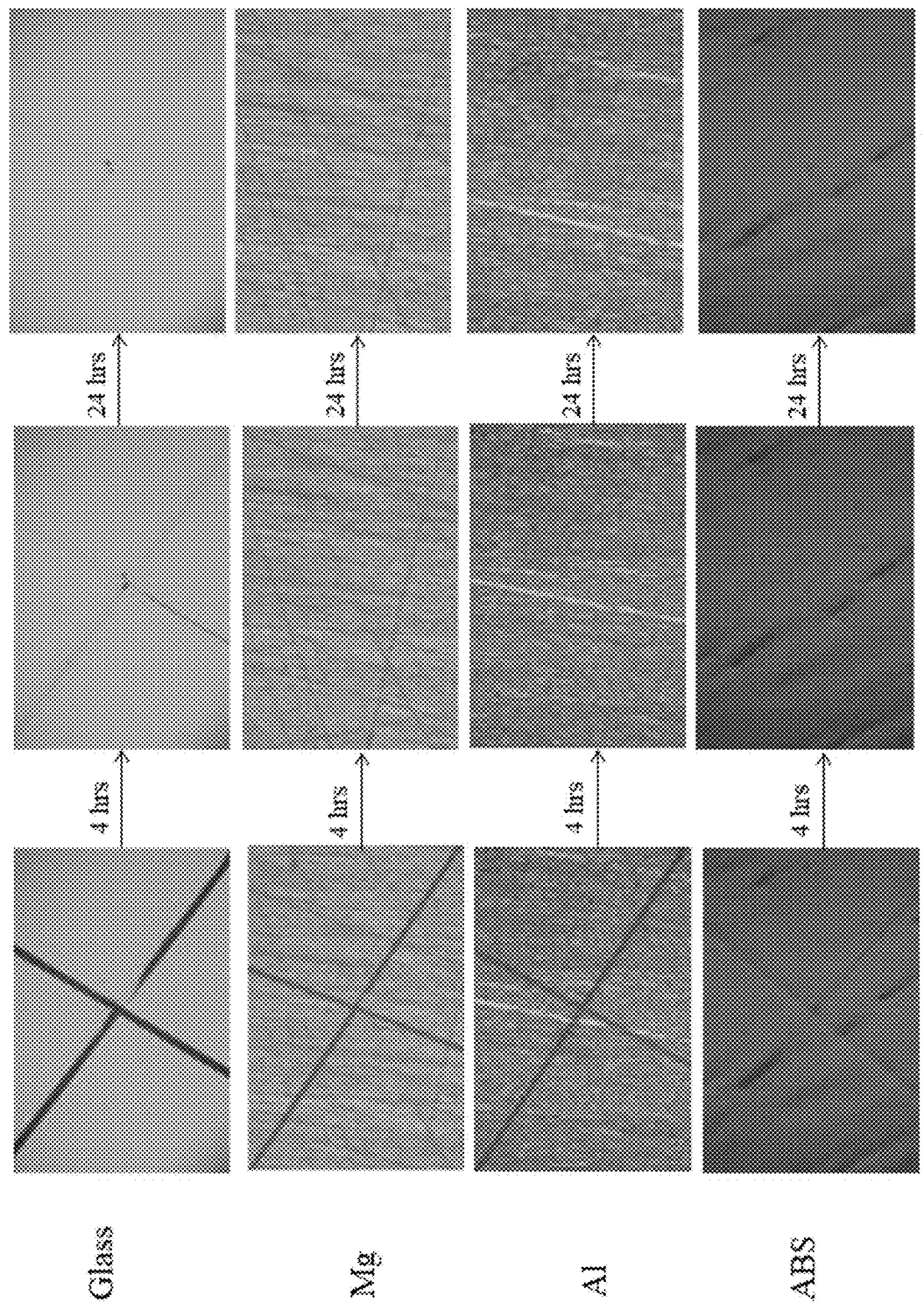
FIG. 4 shows microscopic images of the PCL diol-HDI-DMPA (1:6:0.1) polymer composition coated on glass, magnesium, aluminium, and ABS after cutting a cross by a razor blade (to create deep cracks) according to certain embodiments described herein.

When the molar ratio of PCL diol-HDI-DMPA is 1:6:0.1, the hardness of the polymer coating on glass for pencil test is around 3H-4H. The adhesiveness of the polymer coating on glass is 5B. The optimized PCL diol-HDI-DMPA (1:6:0.1) polymer mixture on glass exhibited instant self-healing property for scratch test by a scratch tester with 1 kg load. It showed no healing for deep crack created by a razor blade in the absence of moisture, but fully healed the crack when contacting the coating with moisture for 24 hrs (FIG. 4).

Figure 3:
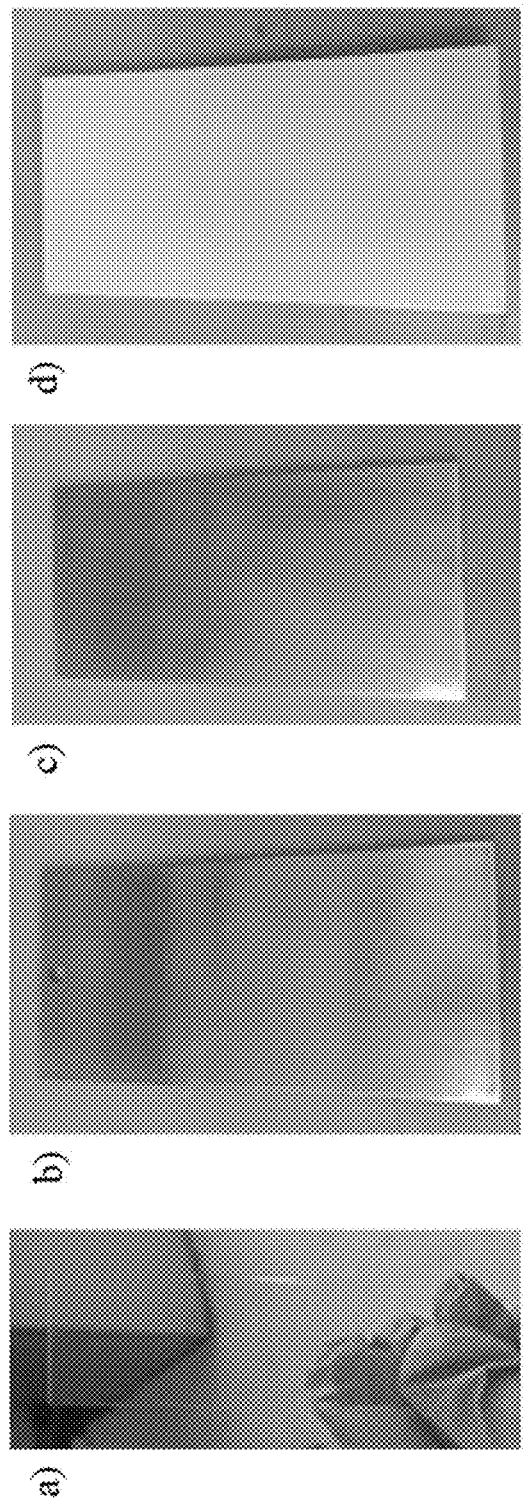
FIG. 3 depicts photos of the PCL diol-HDI-DMPA (1:6:0.1) polymer composition coated on a) glass b) magnesium c) aluminium d) ABS according to certain embodiments described herein.

The polymer mixture of PCL diol-HDI-DMPA (1:6:0.1) was coated on other substrates, such as magnesium, aluminum, and acrylonitrile butadiene styrene (ABS) plastic, by spraying (FIG. 3). The results for pencil hardness test and adhesion test were 3H/4H and 5B respectively. Instant self-healing property was observed for scratch test with 1 kg load. Although the deep crack was not healed in the absence of moisture, it was fully healed when contacting the coatings with moisture for 24 hrs (FIG. 4). PCL diol-HDI-DMPA (1:6:0.1) coating on ABS passed the Restriction of the Use of Certain Hazardous Substances (RoHS) test for cadmium, lead, mercury, hexavalent chromium, polybrominated biphenyls and polybrominated diphenyl ethers. It also passed the REACH test for organotin, cadmium, polycyclic aromatic hydrocarbons and lead.

The properties for the self-healing coating composition according certain embodiments of the present disclosure are summarized in the Table 1 below, wherein the molar ratio of PCL diol-HDI-DMPA is 1:6:0.1.

TABLE 1

| Composition of the polymer mixture | Substrate | Thickness | Hardness | Adhesiveness | Self-healing Property |  |  |
|---|---|---|---|---|---|---|---|
|  |  |  |  |  | Scratch (1 kg load) | Deep crack (without moisture) | Deep crack (with moisture) |
| PCL diol$_{FW-530}$- HDI-DMPA (1:6:0.1) | Glass | — | 3H | 5B | instant | no healing | fully healed |
|  | Mg | 40-60 | 4H | 5B | instant | no healing | fully healed |
|  | Al | 70-90 | 4H | 5B | instant | no healing | fully healed |
|  | ABS | — | 3H | 5B | instant | no healing | fully healed |

Increasing the molar ratio of DMPA relative to PCL diol from 0.1 to 0.5 or 1 greatly decreased the hardness of the coating to 2H and HB for PCL diol-HDI-DMPA (1:6:0.5) and (1:6:1) respectively. The scratch created by a scratch tester with 1 kg load can only be healed within 1 min for PCL diol-HDI-DMPA (1:6:0.5) polymer coating, while the scratch remained for the PCL diol-HDI-DMPA (1:6:1) polymer coating. Similar to previous results, no self-healing property was observed without moisture after cut by a razor blade, and 90% healing was observed when the coating stayed under a moisturized environment. Mechanical and self-healing properties of coatings made of PCL diol-HDI-DMPA at different molar ratios on glass slides are summarized in Table 2 below.

ylene glycol (PEG, average molecular weight: 400) and 0.08-0.8 g of 2,2-bis(hydroxymethyl)propionic acid (DMPA, average molecular weight: 134.13). The acetonitrile solution containing polyethylene glycol (1 equiv), hexamethylene diisocyanate trimer (4.5-9 equiv.), 0.1 g YCK1110, 0.005 g bismuth neodecanoate as catalyst (dissolved in 0.05 mL DMSO) and 2.5 mL 2-butanone were allowed to stir at room temperature for 15 min. After that, DMPA (0.1-1 equiv.) was added into the mixture and the whole solution was allowed to stir at room temperature for further 15 min before it was used for spraying on substrate. The substrate coated with the above-mentioned polymer mixture was then cured at 60° C. FIG. 1 shows the synthesis route of a PEG-HDI-DMPA polymer network according to certain embodiments of the present disclosure. ATR-FTIR spectrum of PEG-HDI-DMPA (1:6:0.1) polymer film is shown in FIG. 2 (lower line).

When the molar ratio of PEG-HDI-DMPA is 1:6:0.1, the hardness of the polymer coatings on glass for pencil test was 3H and the adhesive properties remained as 5B. The optimized PEG-HDI-DMPA (1:6:0.1) polymer mixture healed the scratch by a scratch tester with 1 kg load within 30 s. It showed no healing for cut made be a razor blade in the absence of moisture but fully healed the crack when contacting the coating formed by the above-mentioned polymer mixture with moisture for 24 hrs.

The polymer mixture of PEG-HDI-DMPA (1:6:0.1) was also coated on other substrates, such as magnesium, aluminum and acrylonitrile butadiene styrene (ABS) plastic, by spraying. The results for pencil hardness test and adhesion test were 3H and 5B respectively. Instant self-healing property was observed for scratch test with 1 kg load. Although the deep crack cannot be healed in the absence of moisture, it can be fully healed when contacted with moisture for 24 hrs.

TABLE 2

| Molar Ratio of PCL diol$_{FW=530}$:HDI:DMPA | Hardness | Adhesiveness | Self-healing Property |  |  |
|---|---|---|---|---|---|
|  |  |  | Scratch (1 kg load) | Deep crack (without moisture) | Deep crack (with moisture) |
| 1:4.5:0.1 | 3H | 5B | instant | no healing | About 95% healed |
| 1:6:0.1 | 3H | 5B | instant | no healing | fully healed |
| 1:7.5:0.1 | 4H | 5B | healed within 1 minute | no healing | fully healed |
| 1:9:0.1 | 4H | 5B | slight scratch | no healing | fully healed |
| 1:6:0.5 | 2H | 5B | healed within 1 minute | no healing | About 90% healed |
| 1:6:1 | HB | 5B | slight scratch | no healing | About 90% healed |

Example 2

According to certain embodiments of the present disclosure, the polymer network is made by an in-situ polymerization of 13.6-27.2 g of hexamethylene diisocyanate trimer (HDI, average molecular weight: 504.6), 2.4 g of polyeth- The properties for the self-healing coating composition according certain embodiments of the present disclosure are summarized in the Table 3 below, wherein the molar ratio of PEG-HDI-DMPA is 1:6:0.1.

TABLE 3

| Composition of polymer matrix | Substrates | Thickness | Hardness | Adhesion | Scratch (1 kg load) | Self-healing Property Deep crack (without misture) | Deep crack (with moisture) |
|---|---|---|---|---|---|---|---|
| PEG-HDI-DMPA (1:6:0.1) | Glass | — | 3H | 5B | healed within 30 s | no healing | fully healed |
| | Mg | 40-60 | 4H | 5B | instant | no healing | fully healed |
| | Al | 40-60 | 4H | 5B | instant | no healing | fully healed |
| | ABS | — | 4H | 5B | instant | no healing | fully healed |

Increasing the molar ratio DMPA relative to the PEG according to certain embodiments of the present disclosure from 0.1 to 0.5 or 1 would soften the coatings to 2H or 6B hardness respectively, having a similar trend with the results of PCL diol$_{FW=530}$:HDI:DMPA coating. The scratch made by scratch tester with 1 kg load healed within 30 s for PEG-HDI-DMPA (1:6:0.5) polymer coating but slight scratch remained for PEG-HDI-DMPA (1:6:1) polymer coating. No self-healing property for deep crack test was observed without moisture. When stayed under moisture environment, PEG-HDI-DMPA (1:6:0.5) coating still displayed full self-healing. Nevertheless, PEG-HDI-DMPA (1:6:1) coating peeled off from the glass slide, so the self-healing ability could not be determined.

Comparison between coatings made of PCL diol$_{FW=530}$-HDI-DMPA (1:6:0.1) and coatings made of PEG$_{FW=400}$-HDI-DMPA (1:6:0.1) on glass slides is summarized in Table 4 below.

TABLE 4

| | PCL diol$_{FW=530}$-HDI-DMPA (1:6:0.1) | PEG$_{FW=400}$-HDI-DMPA (1:6:0.1) |
|---|---|---|
| Hardness | 3H | 3H |
| Adhesion | 5B | 5B |
| Self-healing for 1 kg scratch | instant | Healed within 30 s |
| Self-healing for deep crack (without moisture) | No healing | No healing |
| Self-healing for deep crack (moisture environment) | Fully healed | Fully healed |
| Stability in water | stable | Peel off from glass slides |

Example 3

Figure 5:
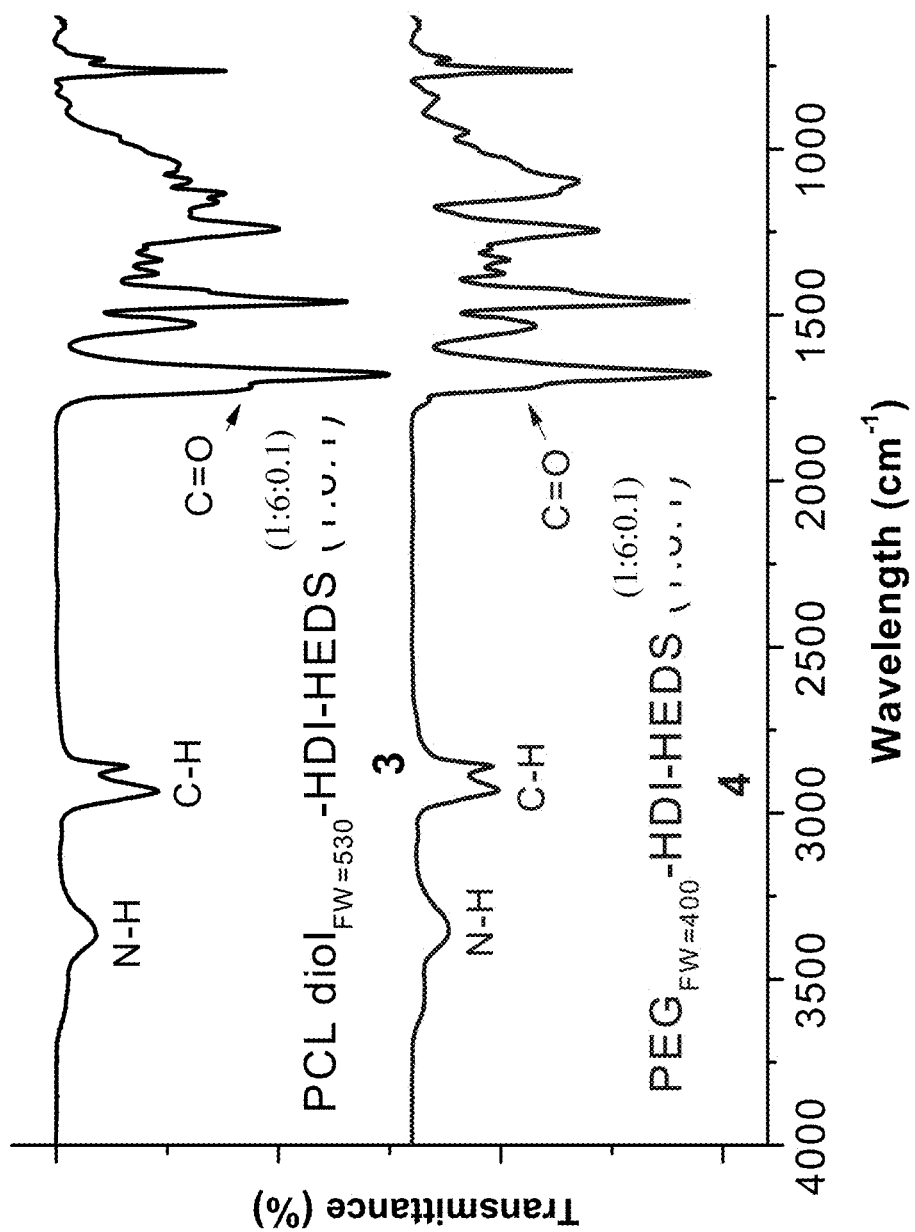
FIG. 5 shows FTIR spectra of the coating formed from the coating composition made of a) PCL diol-HDI-HEDS (1:6:0.1) (upper line) and b) PEG-HDI-HEDS (1:6:0.1) (lower line) with bismuth neodecanoate as catalyst according to certain embodiments described herein.

According to certain embodiment of the present invention, the polymer network is made by an in-situ polymerization of 17.1 g of hexamethylene diisocyanate trimer (HDI, average molecular weight: 504.6), 3.0 g of polycaprolactone diol (PCL diol, average molecular weight: 530) and 0.87 g of bis(2-hydroxyethyl)disulfide (HEDS, average molecular weight: 154.25). The acetonitrile solution containing PCL diol, HDI (6 equiv.), 0.1 g YCK1110, 0.01 g bismuth neodecanoate as catalyst (dissolved in 0.1 mL DMSO) and 2.5 mL 2-butanone were allowed to stir at room temperature for 15 min. After that, HEDS (1 equiv.) was added into the mixture and the whole solution was allowed to stir at room temperature for further 15 min before it was used for spraying on substrate. The substrate coated with the above-mentioned polymer mixture was then cured at 60° C. for 16 hours. FIG. 1 shows the synthesis route of a PCL diol-HDI-HEDS polymer network according to certain embodiments of the present disclosure. ATR-FTIR spectrum of PCL diol-HDI-HEDS (1:6:0.1) polymer film is shown in FIG. 5 (upper line).

The polymer coating on glass showed 2H grade for pencil hardness test while those on magnesium, aluminium or ABS displayed 4H hardness. All coatings on the above-mentioned substrates showed 5B for adhesion test. The scratch caused by scratch tester with 1 kg load was healed instantly under ambient condition without external intervention. The cut made by a razor blade could not be healed without moisture but can be fully healed in the presence of moisture.

The properties for the self-healing coating composition according to certain embodiments of the present disclosure are summarized in the Table 5 below, wherein the molar ratio of PCL diol-HDI-HEDS is 1:6:0.1.

TABLE 5

| Composition of polymer matrix | Substrates | Thickness | Hardness | Adhesion | Scratch (1 kg load) | Self-healing Property Deep crack (without moisture) | Deep crack (with moisture) |
|---|---|---|---|---|---|---|---|
| PCL diolFW = 530 - HDI-HEDS (1:6:0.1) | Glass | — | 2H | 5B | instant | No healing | fully healed |
| | Mg | 40-60 | 4H | 5B | instant | no healing | fully healed |
| | Al | 40-60 | 4H | 5B | instant | no healing | fully healed |
| | ABS | — | 4H | 5B | instant | no healing | fully healed |

Comparison between coatings made of PCL diol$_{FW=530}$-HDI-HEDS (1:6:1) and coatings made of PEG$_{FW=400}$-HDI-HEDS (1:6:1) on glass slides is summarized in Table 6 below.

TABLE 6

|  | PCL diol$_{FW=530}$-HDI-HEDS (1:6:1) | PEG$_{FW=400}$-HDI-HEDS (1:6:1) |
|---|---|---|
| Hardness | 2H | 3H |
| Adhesion | 5B | 5B |
| Self-healing for 1 kg scratch | instant | instant |
| Self-healing for deep crack (without moisture) | No healing | No healing |
| Self-healing for deep crack (moisture environment) | Fully healed | Peel off |

The properties for the self-healing coating composition according to certain embodiments of the present disclosure are summarized in the Table 7 below, wherein the molar ratio of PCL diol-HDI-HEDS is 1:6:1.

TABLE 7

| Substrates | Mg | Al | ABS |
|---|---|---|---|
| Thickness (μm) | 40 | 40 | — |
| Hardness | 4H | 4H | 4H |
| Adhesion | 5B | 5B | 5B |
| Self-healing for 1 kg scratch | instant | instant | instant |
| Self-healing for deep crack (without moisture) | No healing | No healing | No healing |
| Self-healing for deep crack (moisture environment) | Fully healed | Fully healed | Fully healed |

Example 4

According to certain embodiments of the present disclosure, the polymer network is made by an in-situ polymerization of 12.1 g of hexamethylene diisocyanate trimer (HDI, average molecular weight: 504.6), 1.6 g of polyethylene glycol (PEG, average molecular weight: 400) and 0.62 g of bis(2-hydroxyethyl)disulfide (HEDS, average molecular weight: 154.25). The acetonitrile solution containing PEG (1 equiv), HDI (6 equiv.), 0.1 g YCK1110, 0.005 g bismuth neodecanoate as catalyst (dissolved in 0.05 mL DMSO) and 2.5 mL 2-butanone were allowed to stir at room temperature for 15 min. After that, HEDS (1 equiv.) was added into the mixture and the whole solution was allowed to stir at room temperature for further 15 min before it was used for spraying on substrate. The substrate coated with the above-mentioned polymer mixture was then cured at 60° C. for 16 hours. FIG. 1 shows the synthesis route of a PEG-HDI-HEDS polymer network according to certain embodiments of the present disclosure. ATR-FTIR spectrum of PEG-HDI-HEDS (1:6:0.1) polymer film is shown in FIG. 5 (lower line). The coating on glass slide showed 3H for pencil hardness test and 5B for adhesion test. Instant self-healing ability was observed for scratch test with 1 kg load. However, even with extra sulphur-sulphur interaction, the deep crack could not be healed in the absence of moisture.

Example 5

Figure 6:
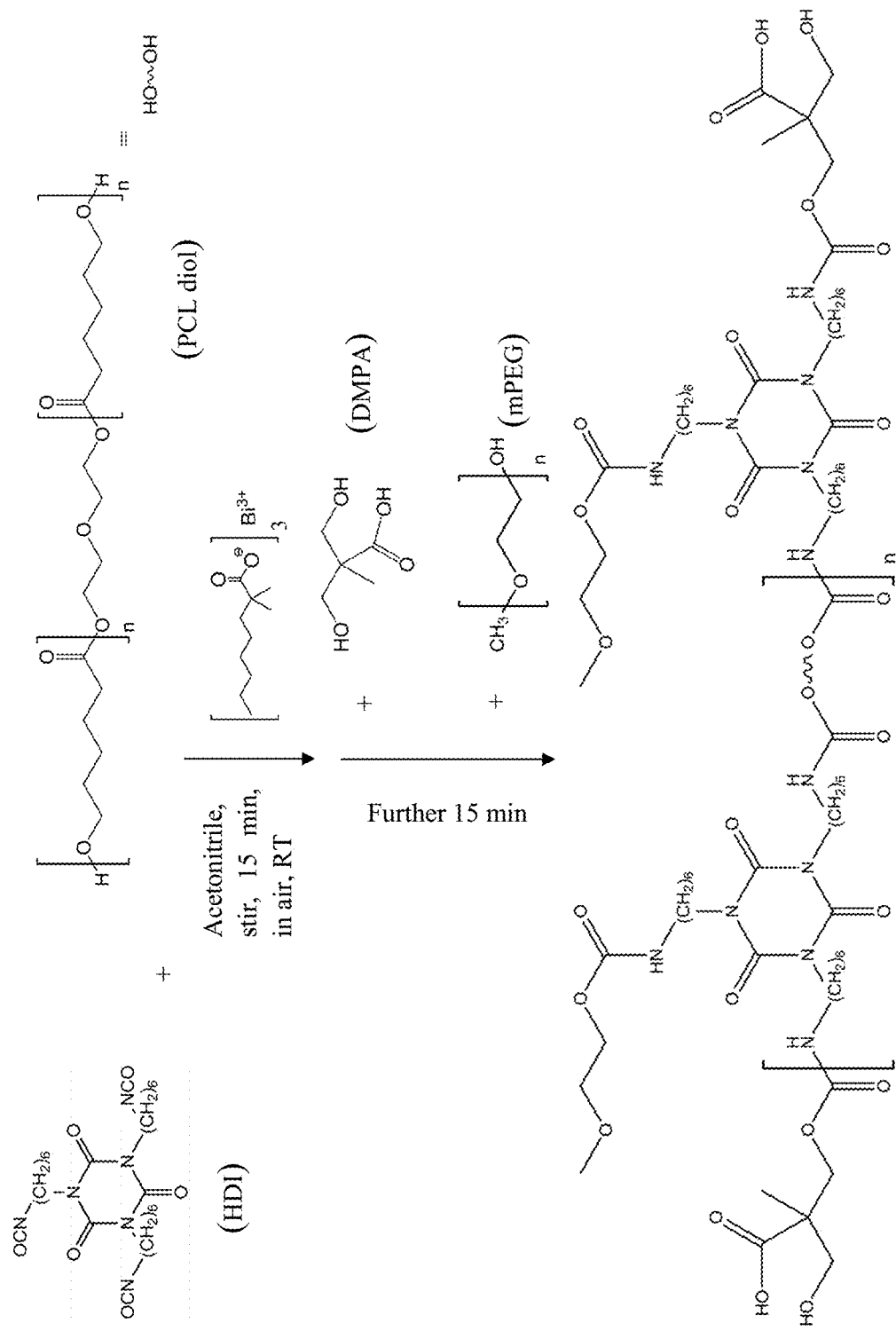
FIG. 6 depicts an exemplary synthetic sequence for the preparation of a PCL diol-HDI-DMPA-mPEG polymer network of the coating composition according to certain embodiments described herein.
Figure 7:
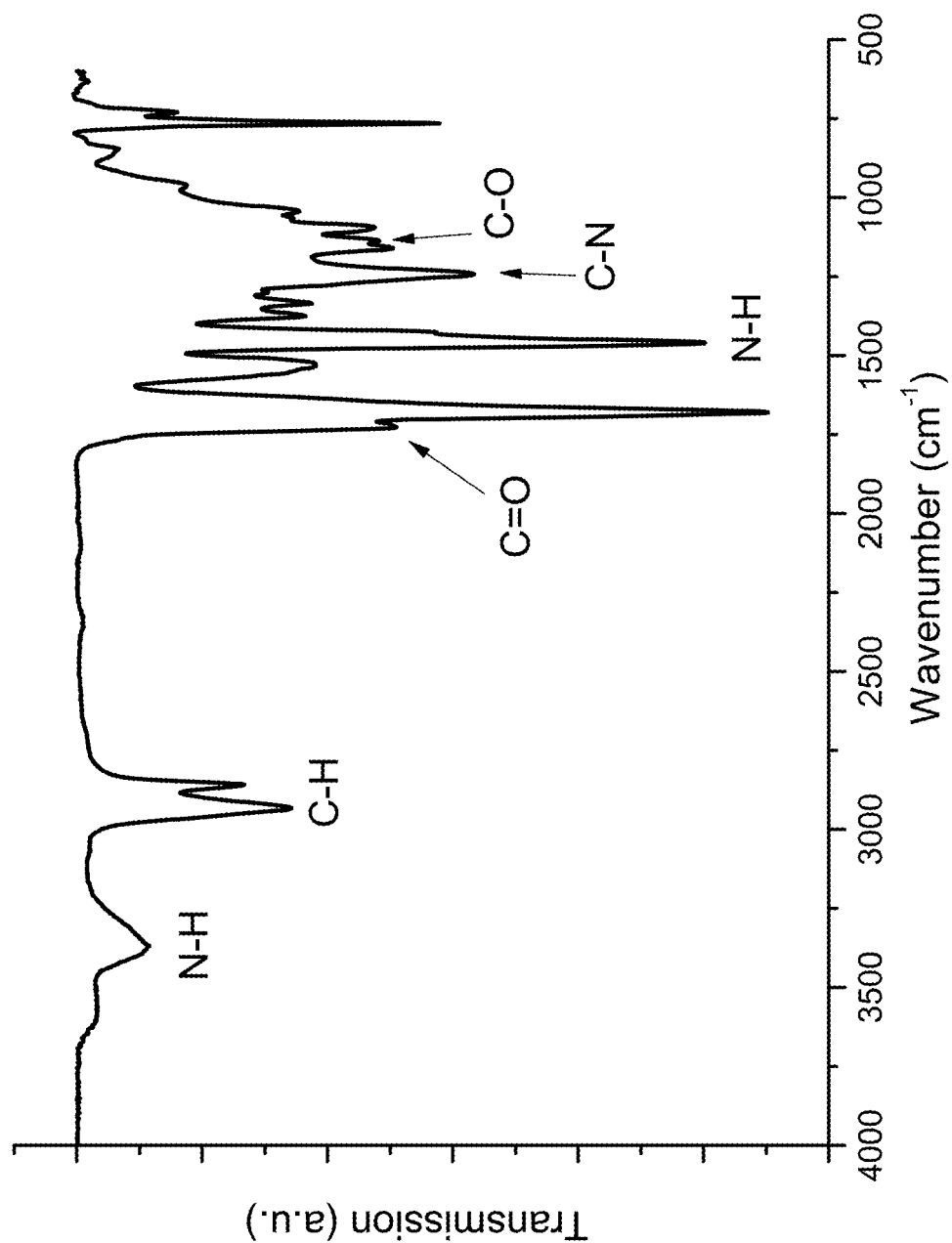
FIG. 7 shows FTIR spectra of the coating formed from the coating composition made of PCL diol-HDI-DMPA-mPEG with bismuth neodecanoate as catalyst according to certain embodiments described herein.

Anti-fouling property of the coating composition of the present disclosure is investigated. According to certain embodiments of the present disclosure, the polymer network is made by an in-situ polymerization of 14.3 g of hexamethylene diisocyanate trimer (HDI, average molecular weight: 504.6), 2.5 g of polycaprolactone diol (PCL diol, average molecular weight: 530), 0.06 g of 2,2-bis(hydroxymethyl)propionic acid (DMPA, average molecular weight: 134.13) and 0.35/0.035 g of poly(ethylene glycol) methyl ether (mPEG, average molecular weight: 750). The acetonitrile solution containing PCL diol, HDI (6 equiv.), 0.1 g YCK1110, 0.01 g bismuth neodecanoate as catalyst (dissolved in 0.1 mL DMSO) and 2.5 mL 2-butanone were allowed to stir at room temperature for 15 min. After that, DMPA (0.1 quiv.) and mPEG (0.1/0.01 equiv.) were added into the mixture and the whole solution was allowed to stir at room temperature for further 15 min before it was used for spraying on substrate. The substrate coated with the above-mentioned polymer mixture was then cured at 60° C. for 16 hours. FIG. 6 shows the synthesis route of a PCL diol-HDI-DMPA-mPEG polymer network according to certain embodiments of the present disclosure. ATR-FTIR spectrum of PCL diol-HDI-DMPA-mPEG polymer (1:6:0.1:0.1) film in the presence of bismuth neodecanoate as catalyst is shown in FIG. 7.

The coating formed by the above-mentioned composition on glass showed H-3H grade for hardness test and 5B for scratch test. Slight scratch remained after scratch test with 1 kg load. The deep cut made by a razor blade was not healed without moisture but was fully healed under moisture environment and stayed for 24 hrs.

The properties for the self-healing coating compositions according certain embodiments of the present disclosure are summarized in the Table 8 below, wherein the molar ratio of PCL diol-HDI-DMPA-mPEG is 1:6:0.1:0.1 and 1:6:0.1:0.01, respectively.

TABLE 8

| Molar Ratio of PCL diolFW = 530-HDI-DMPA-mPEG | Hardness | Adhesion | Self-healing Property | | |
|---|---|---|---|---|---|
| | | | Scratch (1 kg load) | Deep crack (without moisture) | Deep crack (with moisture) |
| 1:6:0.1:0.1 | H | 5B | slight scratch remains | no healing | fully healed |
| 1:6:0.1:0.01 | 3H | 5B | slight scratch remains | no healing | fully healed |

To evaluate the antifouling ability of the coating, the coatings were tested against Escherichia coli (E. coli) based on JIS Z 2801:2012 and the result of the anti-fouling efficiency of the coating with and without modification were summarized in Table 9. As seen in Table 9, the polyurethane coating without mPEG modification has almost no effect on removal of the adsorbed or deposited bacteria from the coating surface. In contrast, by the addition of mPEG, the PCL diol-HDI-mPEG coating (molar ratio of mPEG relative to PCL diol=0.2-1) has >99% bacteria removal efficiency. It is believed that the flexible long chain of mPEG creates a steric repulsion which can limit the bacteria adsorption on the coating surface. In addition, the mPEG side chain facilitates the formation of strong hydration layer on the coating surface, which can further minimize the chance of direct contact between bacteria and the substrate surface. On the other hand, if the molar ratio of mPEG relative to PCL diol is lowered to 0.01, the PCL diol-HDI-DMPA-mPEG (1:6:0.1:0.01) coating only has 19.30% bacteria removal efficiency due to a too low content of mPEG.

TABLE 9

| Molar Ratio of PCL diol$_{FW=530}$-HDI-DMPA-mPEG | Initial E. coli. cell count (CFU/cm2) | E Coli. cell count after 24-hour incubation (CFU/cm2) | Bacteria removal efficiency (%) |
|---|---|---|---|
| 1:4.5:0:0 | 13000 | 12882 | <1 |
| 1:4.5:0:1 | 13000 | 0 | >99.99 |
| 1:6:0:0 | 28000 | 27669 | 1.18 |
| 1:6:0:0.1 | 28000 | 0 | >99.99 |
| 1:6:0.1:0 | 9400 | 9332 | 0.72 |
| 1:6:0.1:0.01 | 9400 | 7586 | 19.30 |

Example 6

Melamine-urea-aldehyde (MUF) microcapsules encapsulating self-healing agents were synthesized using the Lee's method disclosed in X., Liu; X., Sheng; J. K., Lee; M. R., Kessler. *Macrol. Mater Eng.* 2009, 294, 389-395 with slight modification, the contents of which being hereby incorporated by reference in their entirety for all purposes. The self-healing agents comprises isophorone diisocyanate (IPDI) and/or diluents thereof, where the diluent is selected from cyclohexane, toluene, and hexadecane. The physical properties of the microcapsules are summarized in Table 10 below.

TABLE 10

| Capsules no. | Core materials | Rpm | Size (μm) | Appearance |
|---|---|---|---|---|
| 1a | IPDI | 400 | 70-130 | Spheres with dents |
| 1b | | 700 | 50-100 | Spheres with dents |
| 1c | | 1200 | 10-40 | Spheres with dents |
| 2 | IPDI:cyclohexane (1:1) | 1200 | 10-50 | Spheres with dents |
| 3 | IPDI:toluene (1:1) | 1200 | 10-40 | Spheres with dents |
| 4a | IPDI:hexadecane (1:1) | 700 | 50-100 | Spheres with less dents |
| 4b | | 1200 | 10-50 | Spheres with less dents |

Figure 8:
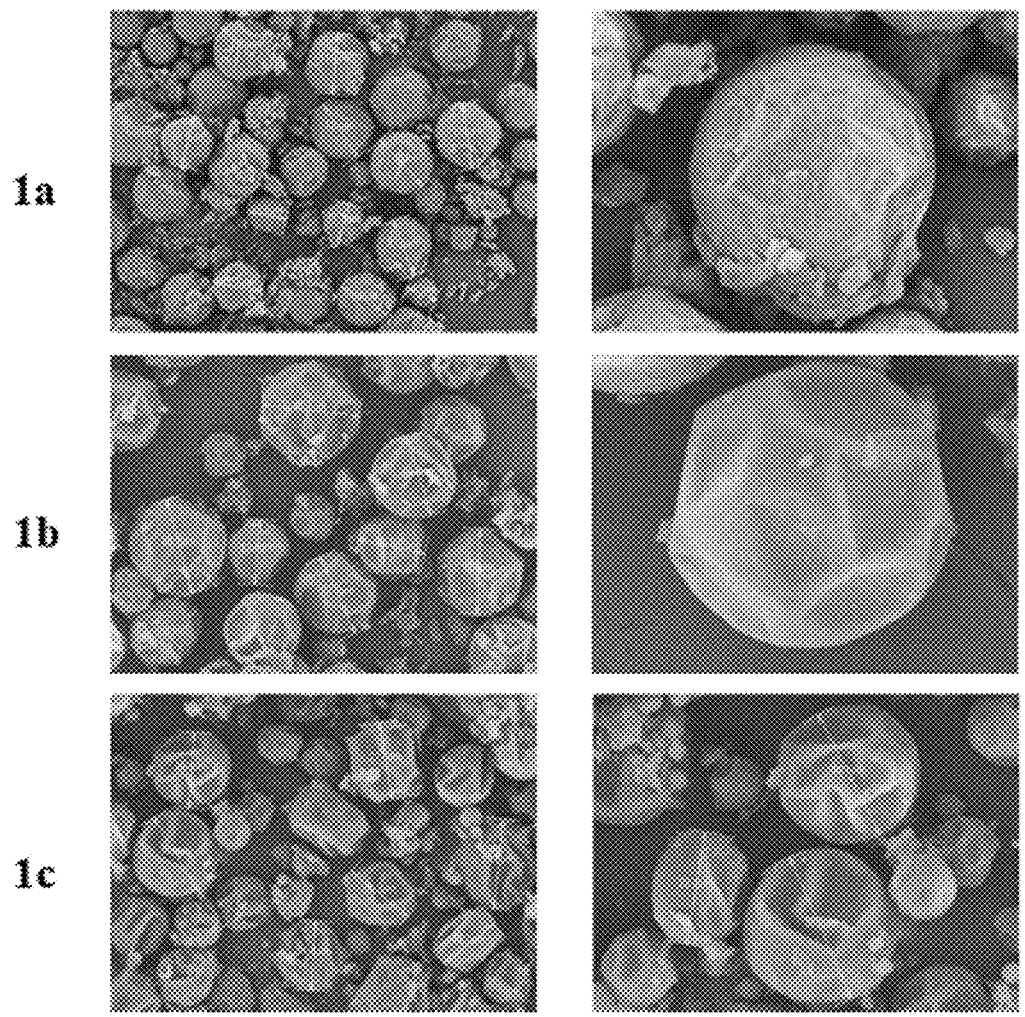
FIG. 8 shows SEM photos of melamine-urea-aldehyde microcapsules (1a, 1b, and 1c) according to certain embodiments described herein.
Figure 9:
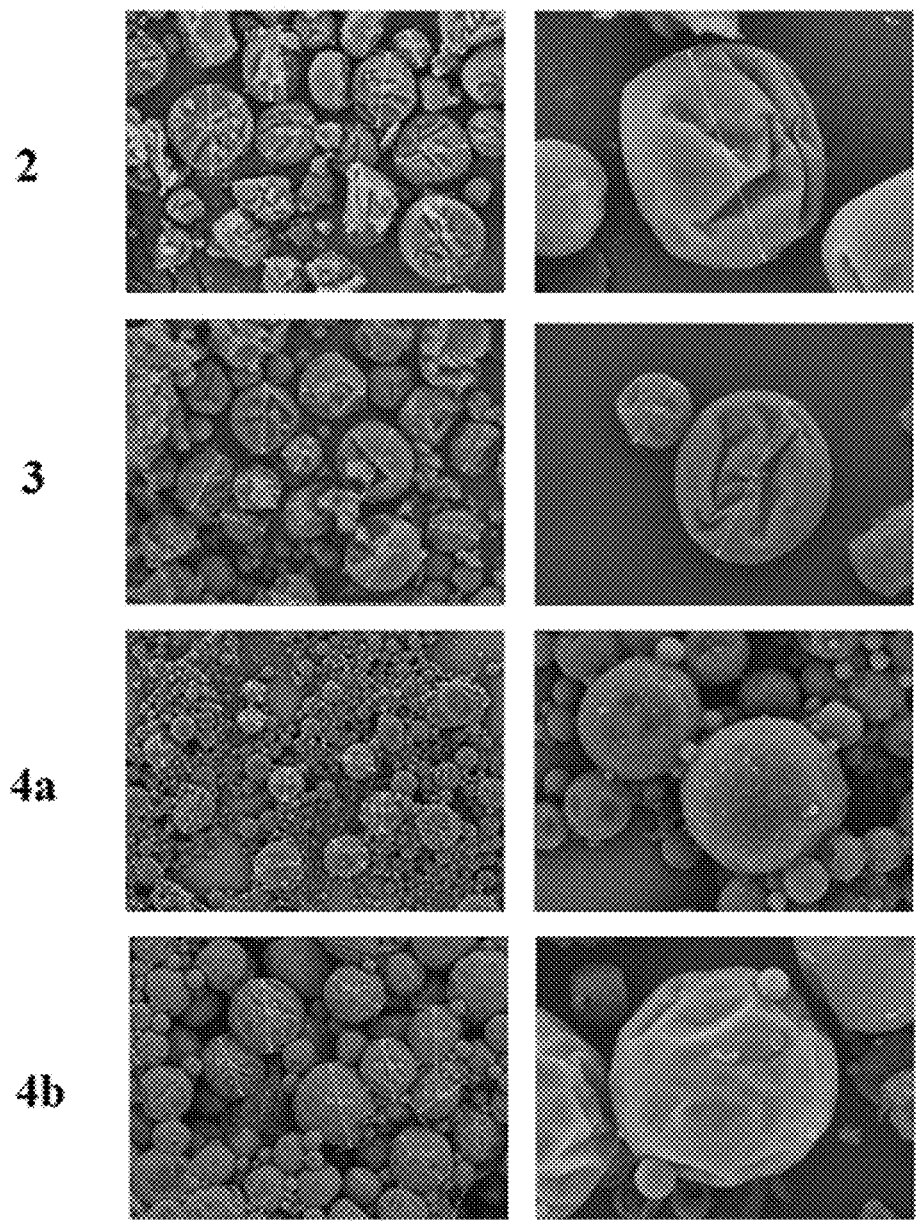
FIG. 9 shows SEM photos of melamine-urea-aldehyde microcapsules (2, 3, 4a and 4b) according to certain embodiments described herein.
Figure 10:
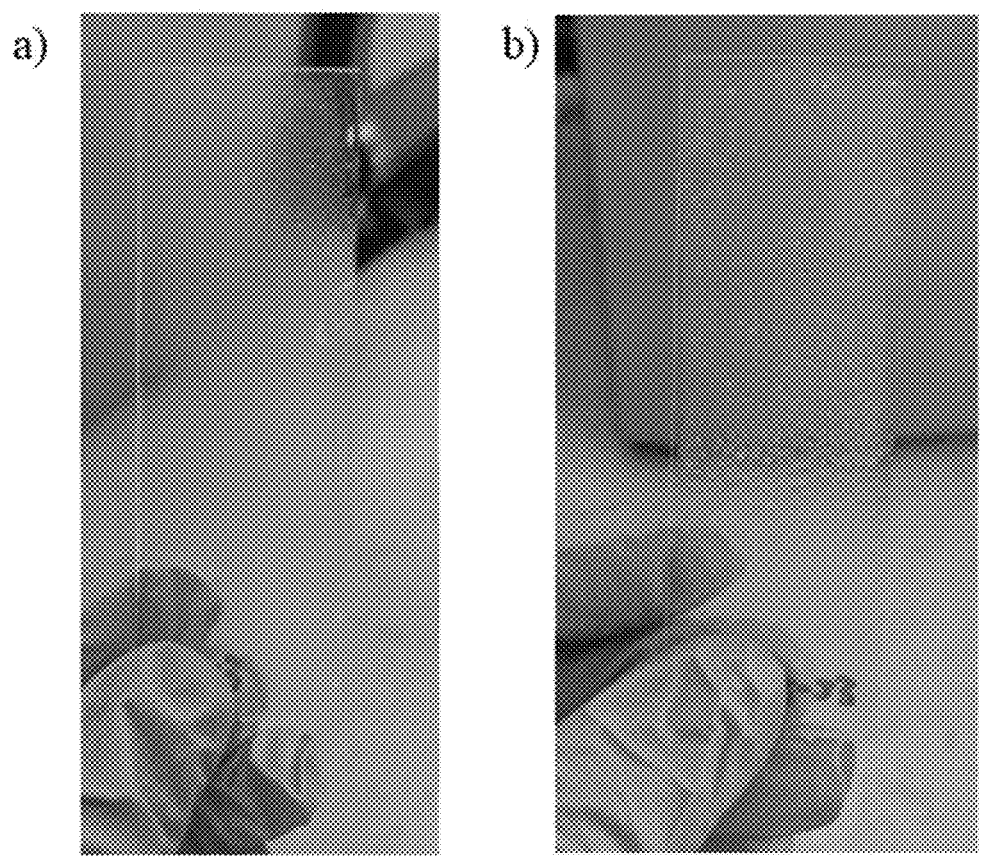
FIG. 10 shows photos of the PCL diol-HDI polymer composition embedded with MUF capsules 1b at a) 2 wt % and b) 4 wt % coated on glass according to certain embodiments described herein.

According to certain embodiments of the present disclosure, the polymer network is made by an in-situ polymerization of hexamethylene diisocyanate trimer (HDI) and polycaprolactone diol (PCL diol), mixed with melamine-urea-formaldehyde (MUF) microcapsules (FIG. 8 and FIG. 9). The acetonitrile solution containing PCL diol (1 equiv), HDI (6 equiv.), 0.1 g YCK1110, 0.01 g bismuth neodecanoate as catalyst (dissolved in 0.1 mL DMSO) and 2.5 mL 2-butanone were allowed to stir at room temperature for 15 min. After that, the microcapsules (2 or 4 wt %) were added into the mixture and the whole solution was allowed to stir at room temperature for further 15 min before it was coated on substrate by dropping (FIG. 10).

Figure 11:
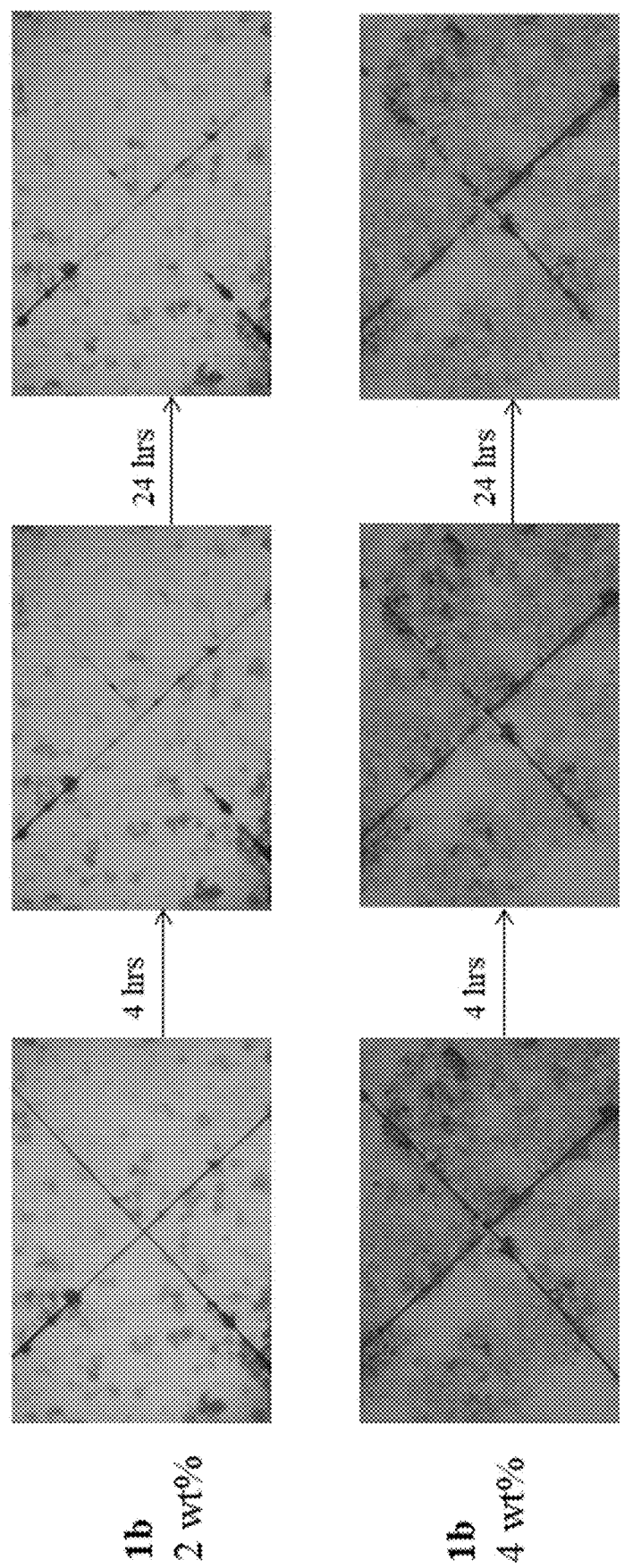
FIG. 11 shows microscopic images of the PCL diol-HDI polymer composition embedded with MUF capsules 1b at a) 2 wt % and b) 4 wt % coated on glass after cutting a cross by a razor blade and then contacted with moisture according to certain embodiments described herein.

All coatings with microcapsules displayed satisfactory results in hardness test (2H-3H) and adhesion test (5B). Nevertheless, slight scratch remained after self-healing test for scratch (load of 1 kg), which might be due to the irreversible rupture of capsules. All coatings did not perform well in self-healing test for deep crack (FIG. 11).

The properties for the self-healing coating compositions according certain embodiments of the present disclosure are summarized in the Table 11 below.

TABLE 11

| | | | | | | Self-healing | |
|---|---|---|---|---|---|---|---|
| Entries | Capsules | Wt. % of capsules | Hardness | Adhesion | 1 kg scratch | Deep crack (without moisture) | Deep crack (with moisture) |
| 1 | IPDI, 10-50 μm | 4 | 3H | 5B | Slight scratch remains | no healing | no healing |
| 2 | IPDI, 50-100 μm | 2 | 2H | 5B | Slight scratch remains | no healing | partly healed |
| 3 | | 4 | 2H | 5B | Slight scratch remains | no healing | partly healed |
| 4 | IPDI, 70-130 μm | 4 | 2H | 5B | Slight scratch remains | no healing | no healing |
| 5 | IPDI + hexadecane, 50-100 μm | 4 | 2H | 5B | Slight scratch remains | no healing | no healing |

Example 7

Table 12 depicts the in-situ polymerization mixture according to preferred embodiments of the present disclosure.

TABLE 12

| Entries | Diisocyanate | Polyol | Additional | Catalyst |
|---|---|---|---|---|
| 1 | 5.8 g HDI | 3 g PCL diol$_{MW=530}$ | 76 mg DMPA | 0.01 g bismuth neodecanoate |

TABLE 12-continued

| Entries | Diisocyanate | Polyol | Additional | Catalyst |
|---|---|---|---|---|
| 2 | 4.76 g HDI | 2.5 g PCL diol$_{MW-530}$ | 60 mg DMPA, | 0.01 g bismuth neodecanoate |
| 3 | 6 g HDI | 2.4 g PEG$_{MW-40}$0 | 40 mg mPEG$_{FW-750}$ 80 mg DMPA | 0.005 g bismuth neodecanoate |

The foregoing examples illustrate the protective capability of the coatings of the present coating compositions against mechanical, chemical, water and heat damage. It is also capable of imparting anti-fouling property onto the underlying substrate without changing the appearance of the substrate.

While the foregoing disclosure has been described with respect to various embodiments and examples, it is understood that other embodiments are within the scope of the present invention as expressed in the following claims and their equivalents. Moreover, the above specific examples are to be construed as merely illustrative, and not limitative of the remainder of the disclosure in any way whatsoever. Without further elaboration, it is believed that one skilled in the art can, based on the description herein, utilize the present invention to its fullest extent. All publications recited herein are hereby incorporated by reference in their entirety.

What is claimed is:

1. A coating composition precursor comprising:
   a soft segment precursor selected from the group consisting of polycaprolactone diol (PCL diol), polycaprolactone triol, poly(tetramethylene adipate) diol, polyethylene glycol (PEG), polytetrahydrofuran (PTHF) and a combination thereof;
   a hard segment precursor selected from the group consisting of hexamethylene diisocyanate trimer (HDI trimer), hexamethylene diisocyanate, isophorone diisocyanate, 4,4'-dicyclohexylmethane diisocyanate and a combination thereof; and
   a diol selected from the group consisting of 2,2-bis(hydroxylmethyl)propionic acid (DMPA), 2,3-dihydroxyl propionic acid, 2,2-bis(hydroxylmethyl)butyric acid (DMBA), dihydroxybenzoic acid, dihydroxysuccinic acid, bis(2-hydroxyethl)disulfide (HEDS) and a combination thereof;
   wherein the soft segment precursor, the hard segment precursor, and the diol are present in a molar ratio of 1:4.5-9:0.1-1.

2. The coating composition precursor of claim 1, wherein the soft segment precursor is PCL diol, the hard segment precursor is HDI trimer, and the diol is DMPA.

3. The coating composition precursor of claim 2, wherein the molar ratio of the PCL diol, the HDI trimer, and the DMPA is 1:6:0.1-0.5.

4. The coating composition precursor of claim 2, wherein the molar ratio of the PCL diol, the HDI trimer, and the DMPA is 1:6:0.1.

5. The coating composition precursor of claim 1, wherein the soft segment precursor is PEG, the hard segment precursor is HDI trimer, and the diol is DMPA, wherein the molar ratio of the PEG, the HDI trimer, and the DMPA is 1:6:0.1-0.5.

6. The coating composition precursor of claim 1, wherein the molar ratio of the PEG, the HDI trimer, and the DMPA is 1:6:0.1.

7. The coating composition precursor of claim 1, wherein the soft segment precursor is PCL diol, the hard segment precursor is HDI trimer, and the diol is HEDS, wherein the molar ratio of the PCL diol, the HDI trimer, and the HEDS is 1:6:0.1-0.5.

8. The coating composition of claim 1, wherein the molar ratio of the PCL diol, the HDI trimer, and the HEDS is 1:6:0.1.

9. The coating composition precursor of claim 1, wherein the soft segment precursor is PEG, the hard segment precursor is HDI trimer, and the diol is HEDS, wherein the molar ratio of the PEG, the HDI trimer, and the HEDS is 1:6:0.1-0.5.

10. The coating composition precursor of claim 1, wherein the molar ratio of the PEG, the HDI trimer, and the HEDS is 1:6:0.1.

11. The coating composition precursor of claim 2 further comprising poly(ethylene glycol) methyl ether (mPEG).

12. The coating composition precursor of claim 11, wherein the hard segment precursor is PCL diol, the hard segment precursor is HDI trimer, and the diol is DMPA, wherein the molar ratio of the PCL diol, the HDI trimer, the DMPA, and the mPEG is 1:6:0.1-0.5:0.01-0.1.

13. The coating composition precursor of claim 12, wherein the molar ratio of the PCL diol, is HDI trimer, DMPA, and mPEG is 1:6:0.1:0.1.

14. The coating composition precursor of claim 1, wherein the soft segment precursor has an average molecular weight of about 100 to about 1000.

15. The coating composition precursor of claim 14, wherein the soft segment precursor is PCL diol having an average molecular weight of about 530, or PEG having an average molecular weight of about 400.

16. The coating composition precursor of claim 11, wherein the mPEG has an average molecular weight of about 550 to about 950.

17. A method of preparing the coating composition of claim 1, comprising the steps of: a) contacting the soft segment precursor and the hard segment precursor to form a first mixture; and b) contacting the first mixture with the diol thereby forming the coating composition precursor.

18. A self-healing coating, formed by applying the coating composition precursor of claim 1 on a substrate via an applying method.

19. The self-healing coating of claim 18, wherein the substrate is glass, magnesium (Mg), aluminum (Al), acrylonitrile butadiene styrene (ABS), polycarbonate (PC), poly(methyl methacrylate) (PMMA), titanium alloys, or stainless steel.

20. The self-healing coating of claim 18, wherein the applying step is dropping, molding, spraying, brushing, rolling, painting, or spinning.

* * * * *